US011976945B1

(12) United States Patent
Boggu et al.

(10) Patent No.: US 11,976,945 B1
(45) Date of Patent: May 7, 2024

(54) SENSOR ASSEMBLY WITH DEFLECTOR

(71) Applicant: Ford Global Technologies, LLC, Dearborn, MI (US)

(72) Inventors: Subba Reddy Boggu, Prakasam Dist/Andhra Pradesh (IN); Vahan Kazandjian, Warrington, PA (US); Venkatesh Krishnan, Canton, MI (US); Rashaun Phinisee, Ypsilanti, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/067,943

(22) Filed: Dec. 19, 2022

(51) Int. Cl.
*G01D 11/24* (2006.01)
*B60R 11/00* (2006.01)

(52) U.S. Cl.
CPC ............ *G01D 11/245* (2013.01); *B60R 11/00* (2013.01); *B60R 2011/004* (2013.01)

(58) Field of Classification Search
CPC .. G01D 11/245; B60R 11/00; B60R 2011/004
See application file for complete search history.

(56) References Cited

U.S. PATENT DOCUMENTS

| | | | | |
|---|---|---|---|---|
| 2018/0015907 | A1* | 1/2018 | Rice | B60S 1/56 |
| 2020/0130652 | A1* | 4/2020 | Richardson | B08B 5/02 |
| 2020/0191614 | A1* | 6/2020 | Ellgas | G01D 11/24 |
| 2021/0103036 | A1* | 4/2021 | Robertson, Jr. | F28F 3/025 |

FOREIGN PATENT DOCUMENTS

| | | | | |
|---|---|---|---|---|
| CN | 105620751 A | * | 6/2016 | |
| CN | 212275973 U | * | 1/2021 | |
| CN | 212275973 U | | 1/2021 | |
| CN | 213558688 U | * | 6/2021 | |
| CN | 213558688 U | | 6/2021 | |
| EP | 3481683 B1 | * | 10/2020 | B08B 3/02 |
| EP | 3481683 B1 | | 10/2020 | |

* cited by examiner

*Primary Examiner* — Jamel E Williams
(74) *Attorney, Agent, or Firm* — Frank A. MacKenzie; Bejin Bieneman PLC

(57) ABSTRACT

An assembly includes a housing defining a pressurized chamber. The assembly includes a sensor supported by the housing. The assembly includes a shell enclosing the sensor and rotatable relative to the housing, the shell enclosing a second chamber in fluid communication the pressurized chamber, the housing and the shell defining a gap therebetween. The assembly includes a ring supported by the housing, the ring defining an internal passage having an exhaust vent at the gap.

16 Claims, 5 Drawing Sheets

SENSOR ASSEMBLY WITH DEFLECTOR

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
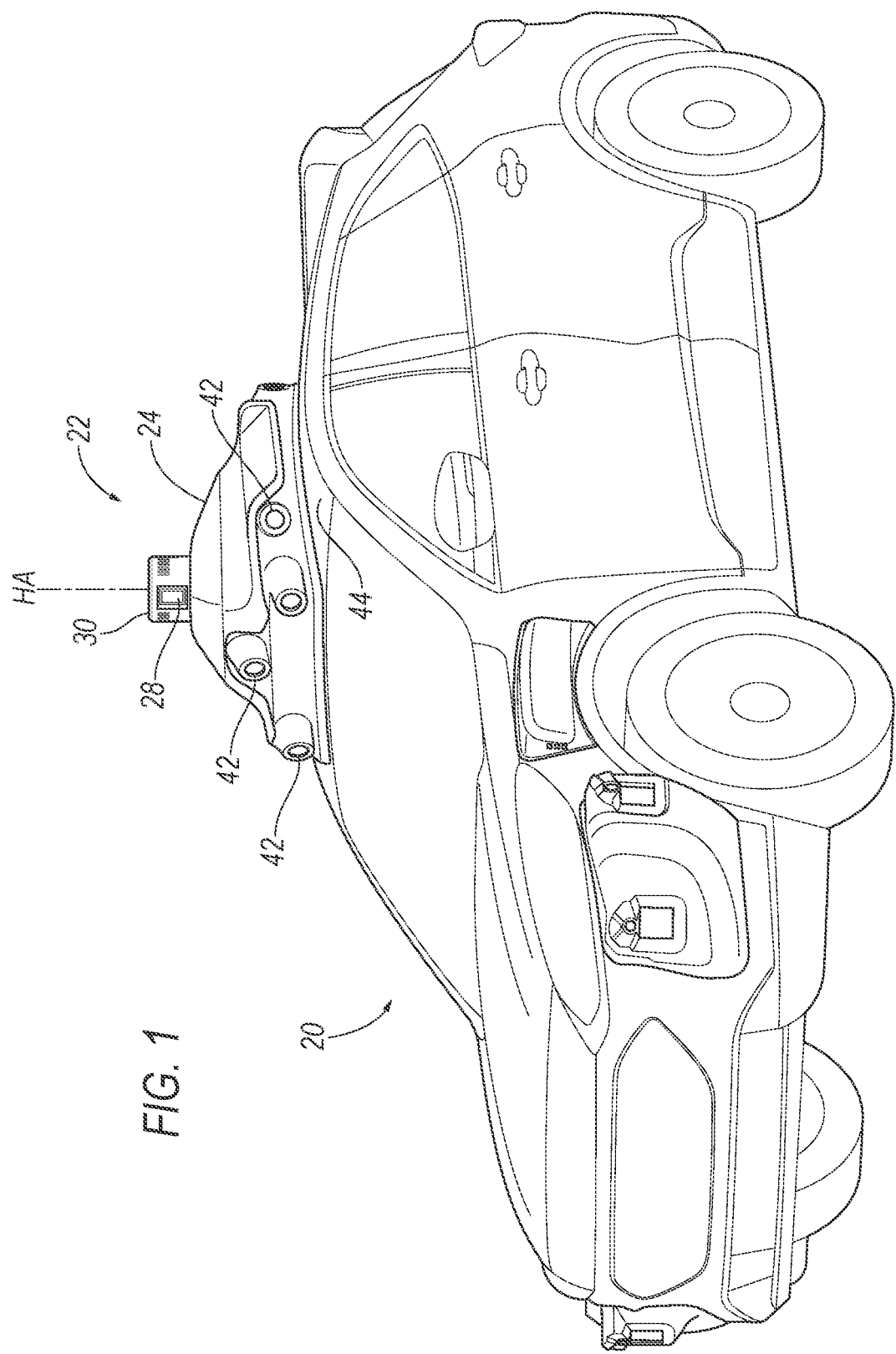
FIG. 1 is a perspective view of an example vehicle with a sensor assembly having a sensor shell and a ring.
Figure 2:
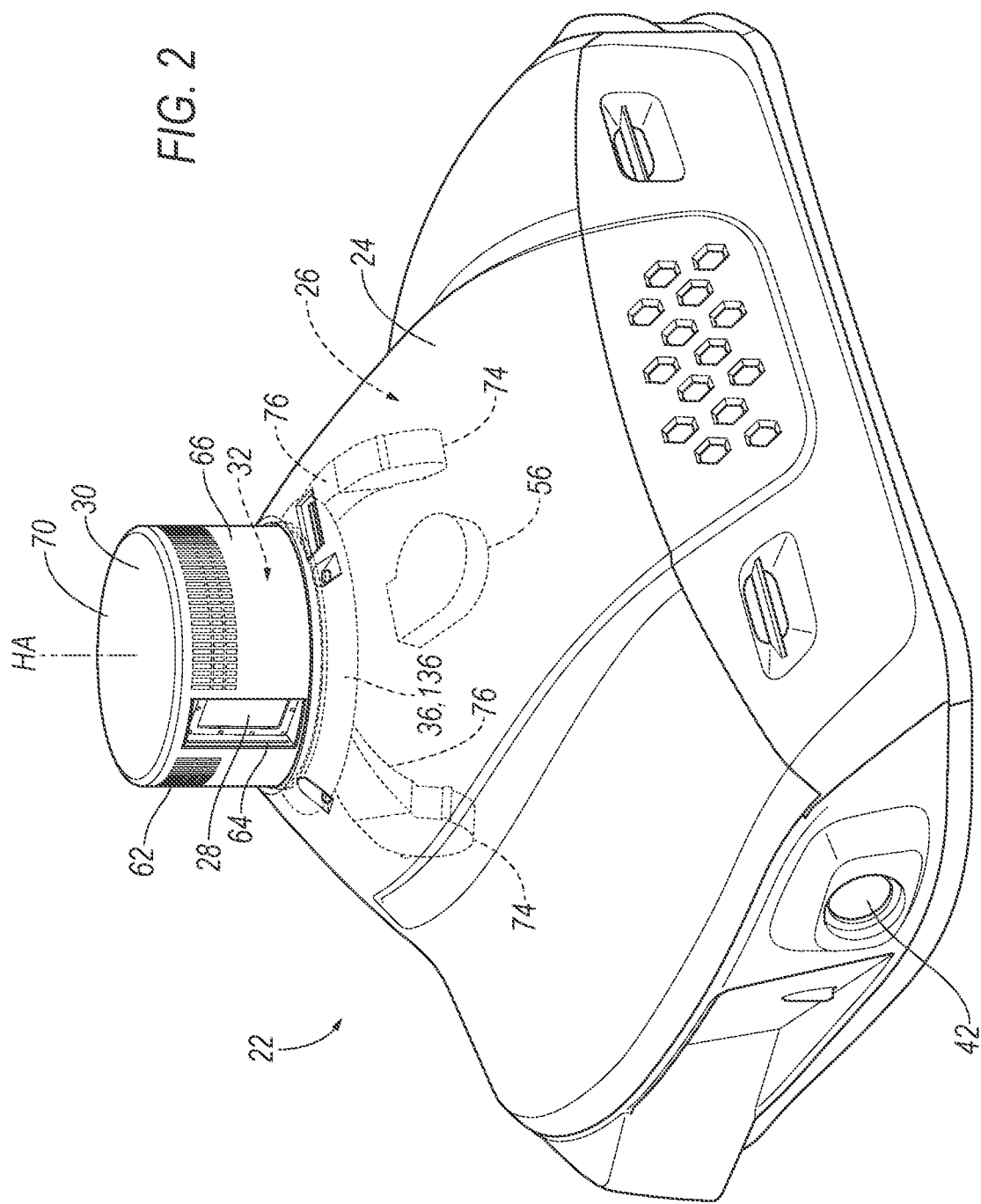
FIG. 2 is a rear perspective view of the sensor assembly.
Figure 3:
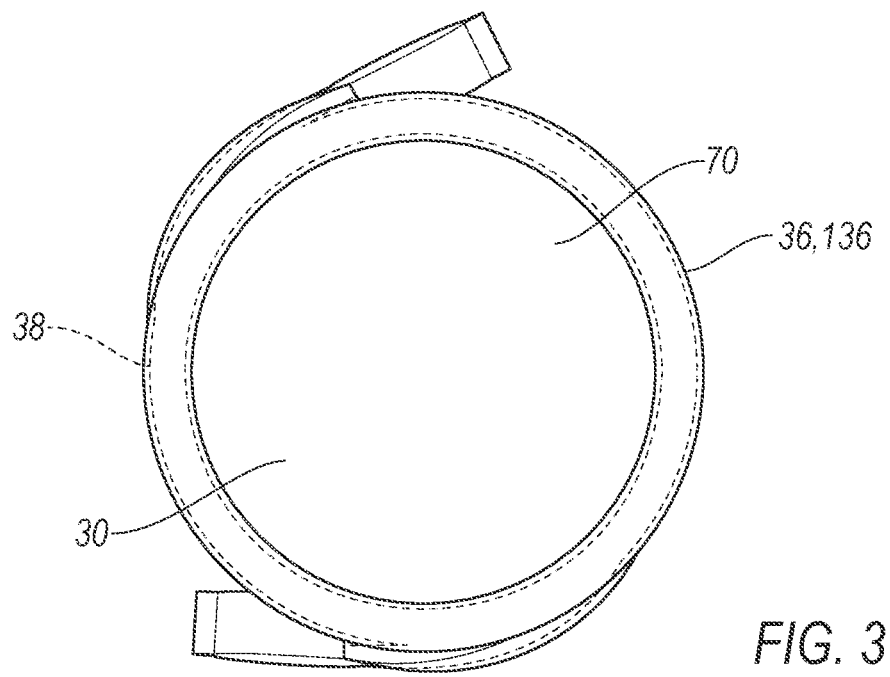
FIG. 3 is a perspective view of the sensor shell and ring of the sensor assembly.
Figure 4:
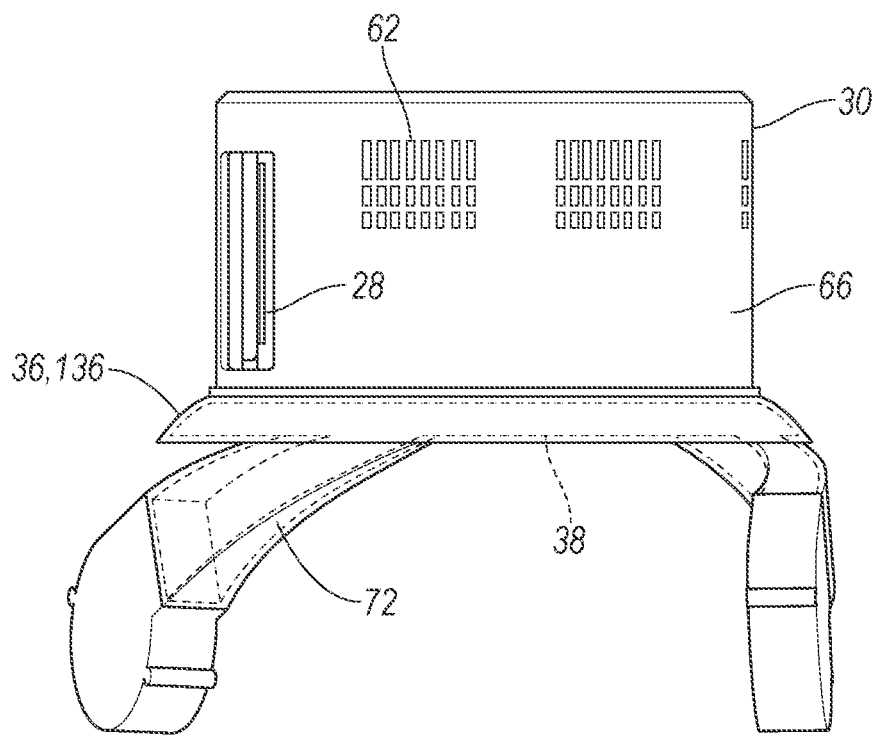
FIG. 4 is a side view of the sensor shell and the ring of the sensor assembly.

An assembly includes a housing defining a pressurized chamber. The assembly includes a sensor supported by the housing. The assembly includes a shell enclosing the sensor and rotatable relative to the housing, the shell enclosing a second chamber in fluid communication the pressurized chamber, the housing and the shell defining a gap therebetween. The assembly includes a ring supported by the housing, the ring defining an internal passage having an exhaust vent at the gap.

The exhaust vent may surround the sensor.

The shell may rotate about an axis, and the exhaust vent may face parallel to the axis.

The exhaust vent may be radially inward of the shell.

The exhaust may vent face the gap.

The exhaust vent may be radially outward of the shell.

The assembly may include a blower in fluid communication with the internal passage.

The assembly may include a duct connecting the blower to the ring.

The shell may rotate about an axis, and the duct may connect to the internal passage at an angle transverse to normal from the ring.

The duct may extend from the internal passage other than radially from the axis.

The duct may extend tangentially from the ring.

The assembly may include a second blower and a second duct connecting the second blower to the ring.

The assembly may include a blower in fluid communication with the pressurized chamber of the housing and the internal passage of the ring.

The assembly may include a blower in fluid communication with the pressurized chamber of the housing, and a second blower in fluid communication with the internal passage of the ring.

The pressurized chamber of the housing may be fluidly isolated from the internal passage of the ring.

The housing and the ring may be unitary.

With reference to the Figures, wherein like numerals indicate like parts throughout the several views, a vehicle 20 with a sensor assembly 22 for collecting information to operate the vehicle 20, e.g., autonomously, is shown. The sensor assembly 22 includes a housing 24 defining a pressurized first chamber 26 therein. The sensor assembly 22 includes a sensor 28 supported by the housing 24. The sensor assembly 22 includes a shell 30 enclosing the sensor 28 and rotatable relative to the housing 24. The shell 30 encloses a second chamber 32 in fluid communication the first chamber 26. The housing 24 and the shell 30 define a gap 34 therebetween. The sensor assembly 22 includes a ring 36, 136 supported by the housing 24, the ring 36, 136 defining an internal passage 38 having an exhaust vent 40, 140 at the gap 34. Air flow from the exhaust vent 40, 140 may decrease loss of pressure from the second chamber 32 through the gap 34.

With reference to FIG. 1, the vehicle 20 may be any passenger or commercial automobile such as a car, a truck, a sport utility vehicle, a crossover, a van, a minivan, a taxi, a bus, etc.

The vehicle 20 may be an autonomous vehicle. A computer can be programmed to operate the vehicle 20 independently of the intervention of a human operator, completely or to a lesser degree. The computer may be programmed to operate a propulsion, brake system, steering system, and/or other vehicle systems base 50$d$ in part on data received from sensors 28 of the sensor assembly 22. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 20 includes a body. The vehicle 20 may be of a unibody construction, in which a frame and the body of the vehicle 20 are a single component. The vehicle 20 may, alternatively, be of a body-on-frame construction, in which the frame supports the body that is a separate component from the frame. The frame and body may be formed of any suitable material, for example, steel, aluminum, etc. The body includes body panels partially defining an exterior of the vehicle 20. The body panels include, e.g., a roof 44, etc. The body panels may present a class-A surface, e.g., a finished surface exposed to view by a customer and free of unaesthetic blemishes and defects.

The sensor assembly 22 collects information, e.g., for use by the computer to autonomously operated the vehicle 20. The sensor assembly 22 collects information with the sensor 28. The sensor 28 may be, for example, a Light Detection and Ranging LIDAR sensor 28. The sensor assembly 22 may include one or more other object detection sensors 42, e.g., supported by and/or within the housing 24. The object detection sensors 42 may include additional LIDAR sensors that provide relative locations, sizes, and shapes of objects surrounding the vehicle 20. As another example, the object detection sensors 42 may include one or more radar vehicle sensors to provide locations of the objects, second vehicles, etc., relative to the location of the vehicle 20. The object detection sensors 42 may further alternatively or additionally, for example, include camera vehicle sensors, e.g. front view, side view, etc., providing images from an area surrounding the vehicle 20. In the context of this disclosure, an object is a physical, i.e., material, item that can be represented by physical phenomena e.g., light or other electromagnetic waves, or sound, etc. detectable by the object detection sensors 42. Thus, vehicles, as well as other items including as discussed below, fall within the definition of object herein.

With reference to FIGS. 2-6, the sensor 28 is supported by the housing 24. The sensor 28 can be disposed on top of the housing 24 at a highest point of the housing 24. The housing 24 includes an aperture 46 through which the sensor 28 passes. The aperture 46 is round, e.g., has a circular or slightly elliptical shape. The aperture 46 is centered on a housing axis HA. The aperture 46 of the housing 24 may be at the highest point of the housing 24.

The housing 24 of the sensor assembly 22 is attachable to the vehicle 20, e.g., to one of the body panels of the vehicle 20, e.g., the roof 44. For example, the housing 24 may be shaped to be attachable to the roof 44, e.g., may have a shape matching a contour of the roof 44. The housing 24 may be attached to the roof 44, which can provide the sensor 28 with an unobstructed field of view of an area around the vehicle 20. The housing 24 may be formed of, e.g., plastic or metal.

The sensor 28 includes a base 50, a motor, a sensor body 52, and at least one sensing device 54. The base 50 may be attached to and fixed relative to the housing 24. The motor may be attached to and fixed relative to the base 50. The sensor body 52 and the at least one sensing device 54 may be fixed relative to each other and are rotatably coupled to the base 50 to rotate about the housing axis HA relative to the housing 24, e.g., by being rotatably drivably coupled to the motor. The motor can be any suitable type for rotating the sensor 28, e.g., an electric motor. For example, the motor can include a stator (not shown) fixed relative to the base 50 and a rotor (not shown) rotatable by the stator around the housing axis HA H and fixed relative to the sensor body 52.

The housing 24 defines the first chamber 26. The first chamber 26 is pressurized. For example, the sensor assembly 22 can includes a pressurized-air source 56 that provides air to the first chamber 26. The pressurized-air source 56 can be positioned inside the housing 24. The pressurized-air source 56 may draw air from external of the housing. The pressurized-air source 56 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 56 is positioned to discharge airflow into the housing 24 and through the aperture 46 of the housing 24 and into the shell 30 at a lower edge 58 of the shell 30. The lower edge 58 is positioned to receive airflow from the housing 24. Fins are positioned to receive airflow traveling upward from the lower edge 58. For example, airflow that passes from the housing 24 through the lower edge 58 passes between the fins and then exits the sensor 28 unit through slits 62 and the outlets 64, e.g., of the shell 30. The airflow thus transfers heat from the sensor body 52, thereby cooling the sensor body 52 and the sensing devices 54. The airflow is vertical through the lower edge 58, and the vertical orientation of the fins and the slits 62 facilitates smooth airflow.

The shell 30 is rotatable relative to the housing 24, e.g., about the housing axis HA. For example, the shell 30 may be fixed relative to sensor body 52 and the at least one sensing device 54, and the motor may thereby be drivably coupled to the shell 30.

The shell 30 defines the second chamber 32. The second chamber 32 may be a volume within the shell 30. For example, the shell 30 may include a cylinder 66 having an open bottom end 68 and a closed top end 70. The lower edge 58 may surround the open bottom end 68. The second chamber 32 may be surrounded by the cylinder 66 and be between the open bottom end 68 and the closed top end 70, e.g., along the housing axis HA.

The shell 30 protects the sensor 28, e.g., from rain and debris. The shell 30 encloses the sensor 28. The sensor 28 may be in the second chamber 32. For example, the cylinder 66 may circumferentially surround the sensor 28 between the open bottom end 68 and the closed top end 70. The shell 30 may be transparent in whole or in part to permit detection of objects by the sensor 28. For example, the shell 30 may include a window through with the sensor 28 detects light.

The second chamber 32 is in fluid communication the first chamber 26, i.e., such that pressurized fluid in the first chamber 26 can flow to the second chamber 32. For example, pressurized fluid may flow from the first chamber 26 to the second chamber 32 via the aperture 46 of the housing 24 and the open bottom end 68 of the shell 30. Pressurized fluid in the second chamber 32 may, for example, flow out one or more the outlets 64 of the shell 30. The outlets 64 may be oriented to exhaust pressurized air across a field of view of the sensor 28.

The housing 24 and the shell 30 define the gap 34 therebetween. The gap 34 reduces a resistance to rotation of the shell 30, e.g., relative to if the shell 30 contacted the housing 24 and generated friction therebetween upon movement. The gap 34 may circumferentially surround the shell 30 at the open bottom end 68.

The ring 36, 136 provides air flow to reduce loss of pressure from the first chamber 26 and/or the second chamber 32 via the gap 34. The ring 36, 136 is supported by the housing 24, e.g., at the highest point of the housing 24. The ring 36, 136 is circular and surrounds the aperture 46 of the housing 24. The ring 36, 136 may be fixed to the housing 24, e.g., via fasten, adhesive, friction fit, etc. The housing 24 and the ring 36, 136 may be unitary. Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The ring 36, 136 defines the internal passage 38. The internal passage 38 is within, e.g., enclosed by, the ring 36, 136. The internal passage 38 surrounds the aperture 46 of the housing 24, e.g., around the housing axis HA. The ring 36, 136 may define one or more inlet openings 72 for providing air to the internal passage 38. The inlet openings 72 may be radially outward on the ring 36, 136, e.g., relative to the housing axis HA and on an outer perimeter opposite the exhaust vent 40, 140. The exhaust vent 40, 140 is shown in FIGS. 5 and 6.

The exhaust vent 40, 140 of the ring 36, 136 is in fluid communication with the internal passage 38 and provides directed air flow out of the internal passage 38. The exhaust vent 40, 140 is at the gap 34, e.g., such that air flow from the exhaust vent 40, 140 blocks, disrupts, or otherwise limits air flow out of the first chamber 26 and/or the second chamber 32 via the gap 34. The exhaust vent 40, 140 may extend along the gap 34. The exhaust vent 40, 140 may surround the sensor 28, e.g., around the bottom open end of the shell 30 and the perimeter of the aperture 46 of the housing 24.

Figure 5:
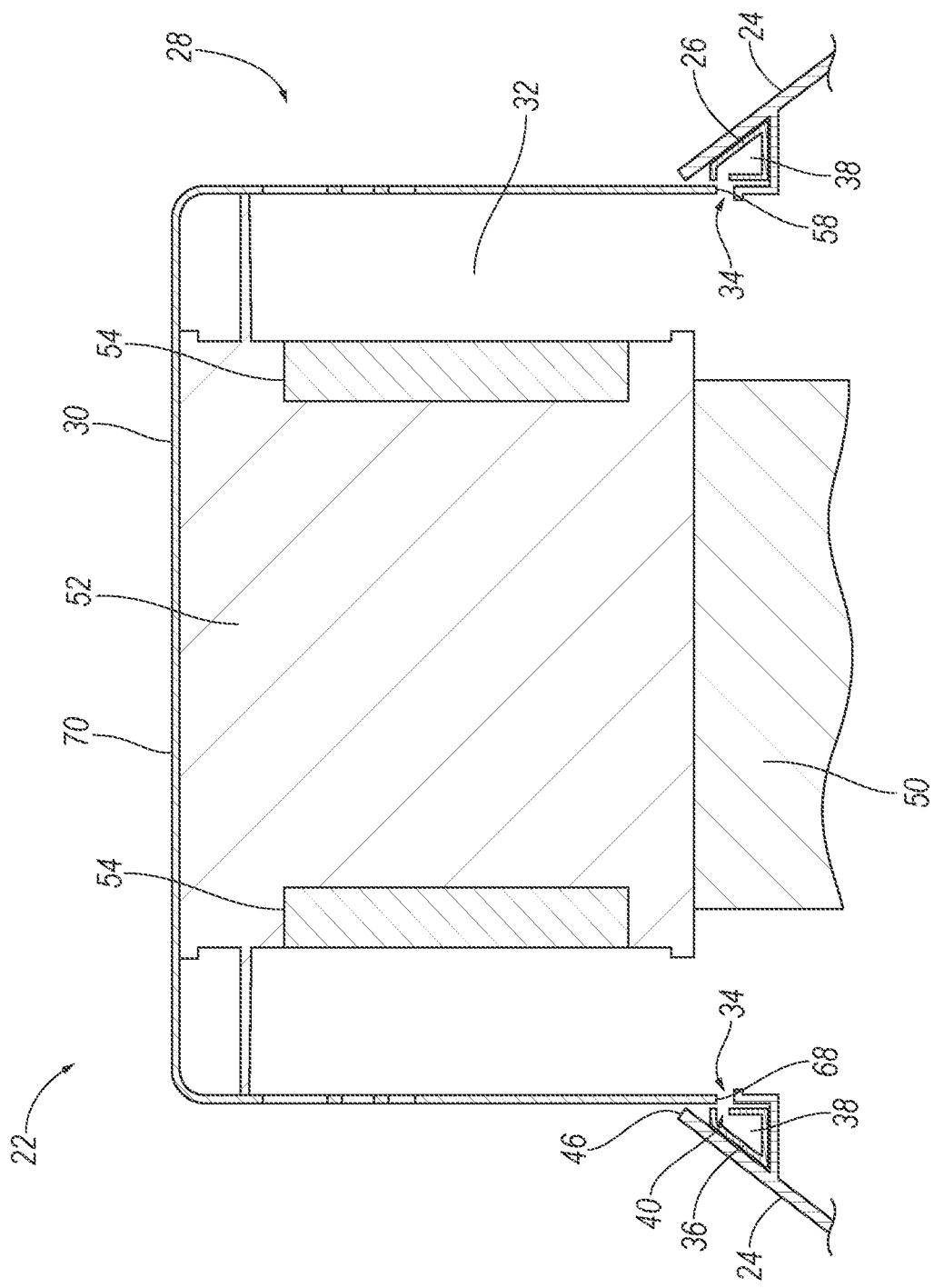
FIG. 5 is a side cross-sectional view of a portion of the sensor assembly with the sensor shell and the ring.

With reference to the example ring 36 shown in FIG. 5, the exhaust vent 40 may face the gap 34, e.g., perpendicular to the housing axis HA. The exhaust vent 40 may be radially outward of the shell 30. For example, the exhaust vent 40 may point radially inward, e.g., creating a ring-shaped air ram that provides radially inward air pressure at an outer perimeter of the shell 30. Air flow out of the exhaust vent 40 may block or otherwise limit air flow out of the second chamber 32 via the gap 34.

Figure 6:
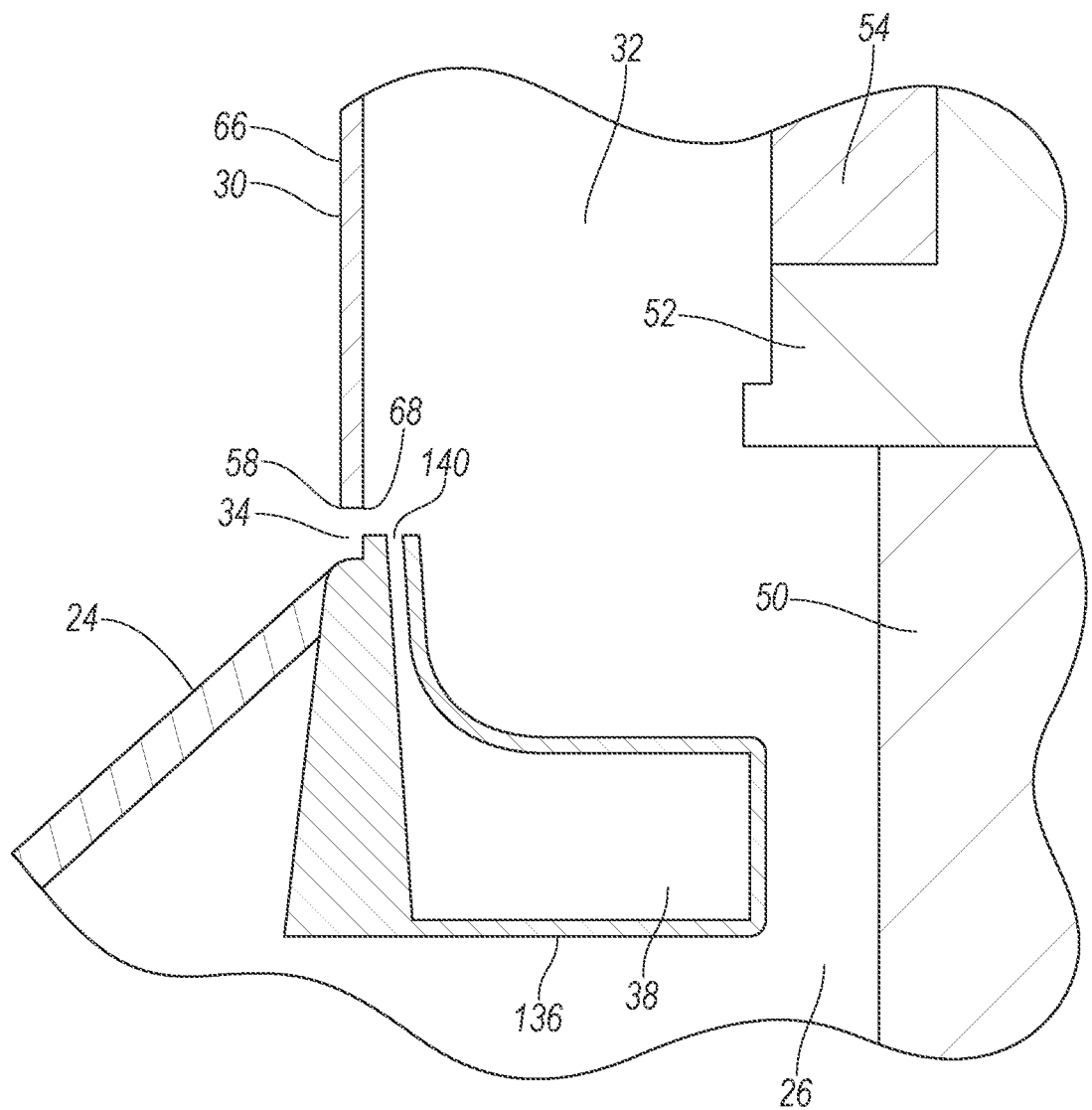
FIG. 6 is a side cross-sectional view of the portion of the sensor assembly with the sensor shell and a ring.

With reference to the example ring 136 shown in FIG. 6, the exhaust vent 140 may face parallel to the housing axis HA. The exhaust vent 140 may be radially inward of the shell 30 relative to the housing axis HA. For example, the exhaust vent 140 may point upward, e.g., creating a ring-shaped air curtain at an inner surface of the shell 30. Upward air flow out of the exhaust vent 140 may block or otherwise limit air flow out of the second chamber 32 via the gap 34.

Returning to FIGS. 2-4, the sensor assembly 22 can include one or more blowers 74 in fluid communication with the internal passage 38, e.g., via one or more ducts 76 that provide air to the internal passage 38 of the ring 36, 136. The ducts 76 may connect the blowers 74 to the ring 36, 136, e.g., the ducts 76 may fluidly couple the blowers 74 to the ring 36, 136 to direct air from the blower to the internal passage 38 of the ring 36, 136. Each of the blowers 74 may be connected to the ring 36, 136 by a respective one of the ducts 76. Each duct 76 may, for example, enclose a second internal passage 78 that extends from one open end of the duct 76 to an opposing open end. The one open end may be fluidly coupled to an exhaust of the respective blower 74 and the opposite open end may be fluidly coupled to the inlet opening 72 of the ring 36, 136. Inlets of each of the blowers 74 may be in fluid combination with, e.g., to draw air from, the first chamber 26 and/or external of the housing 24.

The ducts 76 may be oriented relative to the ring 36, 136 and the internal passage 38 to induce air flow in the internal passage 38 in a single direction, e.g., one of clockwise or counterclockwise. The ducts 76 may connect to the internal passage 38 at angles transverse to normal from the ring 36, 136, e.g., relative to a flow path of the internal passage 38 at the respective inlet opening 72. The ducts 76 may extend from the internal passage 38 other than radially from the housing axis HA. For example, the ducts 76 may extend tangentially from the ring 36, 136, e.g., at the inlet openings 72. In operation, air flow from the blowers 74 may be directed to the ring 36, 136 via the ducts 76. The air flow from the ducts 76 may enter the internal passage 38 generally parallel to internal passage 38, flowing circularly around the ring 36, 136. Directing the air flow in a single direction within the ring 36, 136 may provide a generally consistent air pressure and flow along the entirety of the exhaust vent 40, 140.

One or more of the blowers 74 in fluid communication with the internal passage 38 of the internal passage 38 of the ring 36, 136 may also be in fluid communication with the first chamber 26 of the housing 24 to provide air from the blowers 74 to both the internal passage 38 and the first chamber 26. For example, additional ducts may be fluidly coupled to the blowers 74, e.g., via a branch or manifold, and exhaust air into the first chamber 26.

The pressurized first chamber 26 of the housing 24 is fluidly isolated from the internal passage 38 of the ring 36, 136, i.e., such that air is inhibited from flowing from the first chamber 26 to the internal passage 38 or vise versa. For example, the blowers 74 in fluid communication with the internal passage 38 of the ring 36, 136 may be isolated from, i.e., not in fluid communication with, the first chamber 26 of the housing 24. In such arrangement, air from the blowers 74 flows to the internal passage 38 and not the first chamber 26. The pressurized-air source 56 in fluid communication with the first chamber 26 of the housing 24 may be isolated from, i.e., not in fluid communication with, the internal passage 38 of the ring 36, 136. In such arrangement, air from the second blowers 74 flows to the first chamber 26 and not the internal passage 38.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. An assembly, comprising:
   a housing defining a pressurized chamber;
   a sensor supported by the housing;
   a shell enclosing the sensor and rotatable relative to the housing, the shell enclosing a second chamber in fluid communication with the pressurized chamber, the housing and the shell defining a gap therebetween; and
   a ring supported by the housing, the ring defining an internal passage having an exhaust vent at the gap.

2. The assembly of claim 1, wherein the exhaust vent surrounds the sensor.

3. The assembly of claim 1, wherein the shell rotates about an axis, and the exhaust vent faces parallel to the axis.

4. The assembly of claim 3, wherein the exhaust vent is radially inward of the shell.

5. The assembly of claim 1, wherein the exhaust vent faces the gap.

6. The assembly of claim 5, wherein the exhaust vent is radially outward of the shell.

7. The assembly of claim 1, further comprising a blower in fluid communication with the internal passage.

8. The assembly of claim 7, further comprising a duct connecting the blower to the ring.

9. The assembly of claim 8, wherein the shell rotates about an axis, and the duct connects to the internal passage at an angle transverse to normal from the ring.

10. The assembly of claim 9, wherein the duct extends from the internal passage other than radially from the axis.

11. The assembly of claim 8, wherein the duct extends tangentially from the ring.

12. The assembly of claim 8, further comprising a second blower and a second duct connecting the second blower to the ring.

13. The assembly of claim 1, further comprising a blower in fluid communication with the pressurized chamber of the housing and the internal passage of the ring.

14. The assembly of claim 1, further comprising a blower in fluid communication with the pressurized chamber of the housing, and a second blower in fluid communication with the internal passage of the ring.

15. The assembly of claim 14, wherein the pressurized chamber of the housing is fluidly isolated from the internal passage of the ring.

16. The assembly of claim 1, wherein the housing and the ring are unitary.

\* \* \* \* \*

UNITED STATES PATENT AND TRADEMARK OFFICE
CERTIFICATE OF CORRECTION

PATENT NO. : 11,976,945 B1
APPLICATION NO. : 18/067943
DATED : May 7, 2024
INVENTOR(S) : Subba Reddy Boggu et al.

It is certified that error appears in the above-identified patent and that said Letters Patent is hereby corrected as shown below:

On the Title Page

In the Abstract (57), Line 5:    insert --with-- after "communication"

Signed and Sealed this
Fourth Day of June, 2024

*Katherine Kelly Vidal*

Katherine Kelly Vidal
*Director of the United States Patent and Trademark Office*